April 28, 1942.   W. C. EDDY   2,280,901
ILLUMINATION DEVICE
Filed April 28, 1939
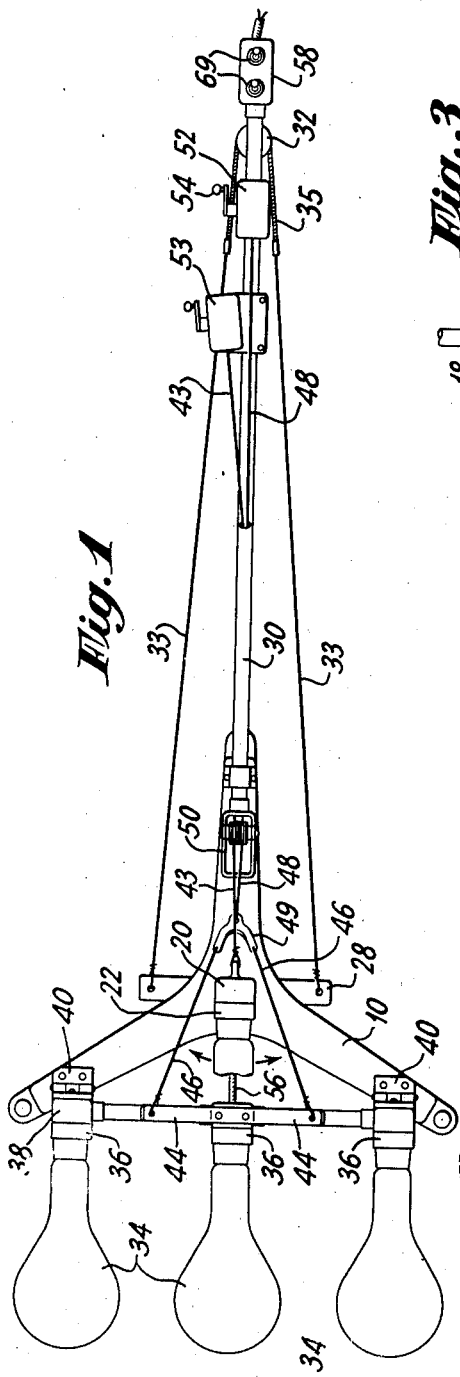
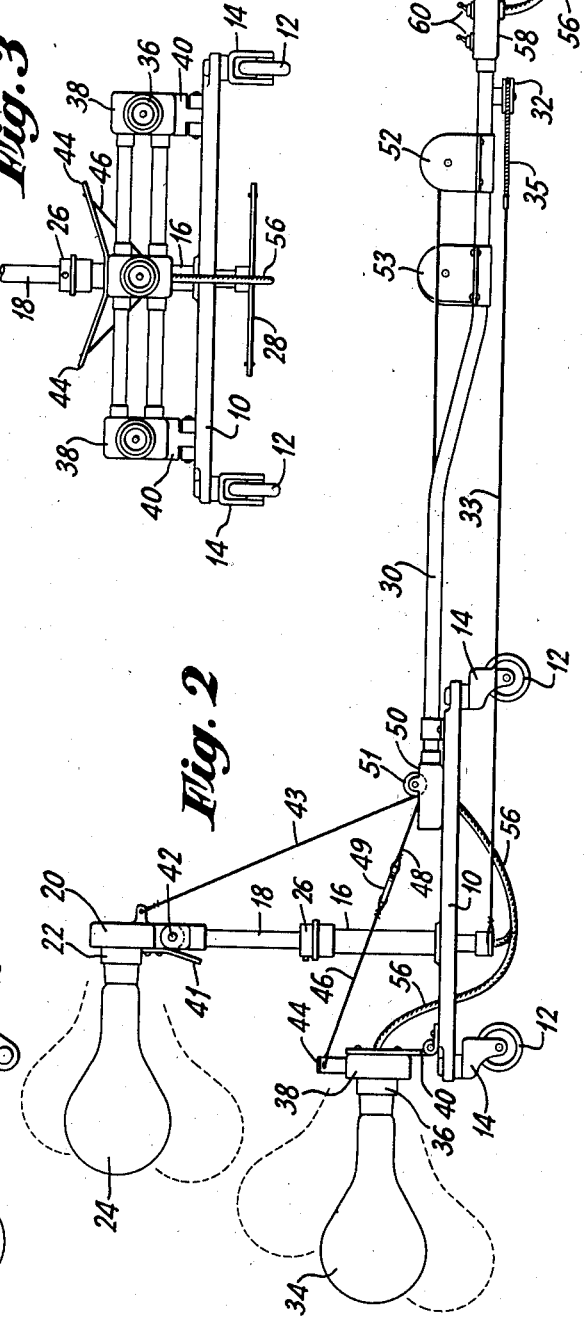
INVENTOR.
WILLIAM C. EDDY
BY
ATTORNEY.

Patented Apr. 28, 1942

2,280,901

UNITED STATES PATENT OFFICE 2,280,901

ILLUMINATION DEVICE

William C. Eddy, Port Washington, N. Y., assignor to Radio Corporation of America, a corporation of Delaware Application April 28, 1939, Serial No. 270,542

1 Claim. (Cl. 240—1.3)

This invention relates to an improvement in illumination devices and more particularly to a device for illuminating a subject or object which is to be televised in a television studio or photographed in a motion picture studio, for example. Further, the invention serves to provide an auxiliary lighting source for theatrical purposes, for example, where the auxiliary lighting is to illuminate the stage action from a location within the off-stage wings.

In moving picture and television studios considerable care must be exercised in lighting the object to be photographed or televised in order that the resultant picture or image may appear natural with all undesirable shadows or highlights eliminated. In such studios the photographic or television camera is frequently moved about during the use of the camera in order to follow closely the center of interest of the action or to view the center of interest of the action from different viewing points. By reason of such movement it quite frequently becomes necessary to change simultaneously the lighting of the subject by changing the position of one or more of the sources of illumination. In order to reduce the physical size and light capacity of the lamps used for illumination and yet afford as intense an illumination of the subject as possible, it is desirable that the lights be positioned relatively close to the subject. In some instances it has been found desirable to utilize several sources of illumination of the character to be described herein and to position such sources between the photographic or television camera and the subject, but preferably out of the optical viewing path of such cameras. When such is the case, it is generally inconvenient or impractical to change the position of such illuminating devices with changes in the position of the camera, since the presence of a person or operator in this region might result in the production of shadows on the subject or even an obstruction of the view so far as the camera is concerned.

Accordingly, it is one purpose of the present invention to provide a lighting device to be used in a moving picture or television studio which may be readily moved about the studio and which may conveniently be caused to follow the movements of the camera.

It is another purpose of the present invention to provide a lighting device which may be positioned between the camera and the subject while at the same time to provide an illumination device which may be readily manually controlled by an operator or attendant.

A still further purpose of the present invention resides in the provision of a lighting device which may be so controlled as to change the vertical position of the illuminated area through remote control in accordance with desired results.

It is still another purpose of the present invention to provide an operable lighting device by means of which the horizontal position of the illuminated area may be remotely controlled at will.

In addition to the above purposes, it is a still further purpose of the present invention to provide a lighting device which may be moved bodily about the studio in order to produce desired illumination effects and in order to change the illuminated area in accordance with changes in the position of the camera.

Still another purpose of the present invention resides in the provision of a dirigible lighting device which may be conveniently controlled and which may be simple and natural in its control operations.

Still other purposes and advantages of the present invention will become more apparent to those skilled in the art from a reading of the following specification and claim, particularly when considered with the accompanying drawing, wherein corresponding reference numerals represent corresponding parts, and wherein:

Figure 1 shows a plan view of the invention;

Figure 2 shows a side elevation of the present invention, and

Figure 3 shows a front elevation of a portion of the present invention.

Referring now to the drawing, the device includes a base member 10 having three extensions. Swiveled wheels 12 are positioned in caster mountings 14 at the end of each of the extensions. These wheels and casters are of such a nature as will permit the device to be rolled about in any direction over the floor of the studio with the same ease and flexibility as the camera and they are preferably provided with rubber tires or peripheries in order to be silent in operation. Centrally positioned with respect to the base member 10 is an upright tubular member 16 inside of which is rotatably positioned another tubular member 18. At the top of the tubular member 18 is an outlet box 20 to which is attached a socket 22 into which may be positioned a source of illumination 24. The tubular member 18 is held against axial movement within the tubular member 16 by means of the collar 26 which is attached to the tubular member 18 by means of a set screw or similar device. The collar 26 and the tubular member 18 may then be rotated with respect to the tubular member 16. The tubular member 18 extends below the base member 10 and at the lower end of the member are attached a pair of lateral extensions 28 by means of which the tubular member 18 and the source of illumination 24 may be rotated about a vertical axis.

Attached to one of the three extensions of the base member 10 is a tubular member 30 by means of which the entire lighting device may be moved about the floor of the studio. At the remote or control end of the tubular member 30 is a pulley 32 which is positioned for rotation about a vertical axis. Connected to each of the extensions 28 is a control cable 33 which is passed over the periphery of the pulley 32. By means of this control cable the tubular member 18 may be rotated about a vertical axis by an operator at the control end of the tubular member 30. The control cable 33 includes an elastic section 35 which may be in the form of a coil spring or similar elastic member in order that the cable 33 may be subjected to a certain amount of tension to maintain the cable taut and to insure that the lamp 24 remains in its adjusted position while being operated until a positive movement of the lamp is manually made.

Positioned at the front of the device are additional illumination devices or sources of illumination 34, which are positioned in sockets 36, the sockets being positioned in outlet boxes 38. In order that the illumination devices or lamps 34 may be rotated about a horizontal axis, a pair of hinge members 40 are provided. These hinges are attached to two of the extensions of the base member 10 and to the back of the outlet boxes 38. Since the lamps 34 and the sockets 36 are positioned forward with respect to the hinge members 40 no means other than the force of gravity are necessary to produce rotation of the lamp assembly in a counter-clockwise direction. However, for rotating the illumination devices 34 in a clockwise direction, that is, in such a manner as to raise the illuminated area, a pair of extensions 44 are provided on the assembly supporting the lamps 34 and to these extensions are connected a pair of cables 46. These cables pass along each side of the vertical tubular members 16 and 18 and are finally attached to a single control member 48 by means of a yoke member 49. At the forward end of the tubular extension 30 is positioned a fair leader 50 and in order to prevent chafing of the control cable 48 a roller 51 is provided. The control cable passes through the tubular extension 30 and the other end of the control cable 48 terminates at a reel device 52 situated at the control end of the tubular extension 30. This reel device is provided with a crank member or handle 54 by means of which the reel may be rotated in order to take in or release desired lengths of the control cable 48. Normally, the reel member 52 is so constructed as to afford sufficient friction to necessitate positive manual rotation in either direction in order to change the position of the lamps 34 to thereby prevent undesired movements of the illumination devices 34 as a result of shock or because of the turning moment produced by the force of gravity.

To prevent the lamps 34 from rotating an excessive amount in a counter-clockwise direction, the lengths of the cables 46 are so chosen as to position the yoke 49 with respect to the tubular member 16 that it may act as a stop, thereby preventing excessive rotation of the lamps 34 about the hinge members 40.

In addition to the movement of the lamp 24 about a vertical axis, provision is also made whereby the lamp may also be rotated about a horizontal axis. In order to permit such a movement the outlet box 20 is pivotally attached to the top of the tubular member 18. The lamp 20 may then be rotated about the pin 42. In order to limit the rotation of the lamp about the pin in a counter-clockwise direction a spring stop member 41 is provided. For rotating the lamp in a clockwise direction to elevate the illuminated area, a cable 43 is provided which enters the fair leader 50. The cable is guided by a roller at the fair leader in order to prevent chafing and to maintain the cables 43 and 48 separated. The other end of the cable 43 terminates at a reel 53 which is similar in construction to the reel 52. The reel 53 is, however, slightly off-set in order to permit free movement of the cables. It may be seen, therefore, that operation of the reel 53 permits rotation of the lamp 24 about a horizontal axis while manipulation of the cables 33 causes rotation of the lamp about a vertical axis.

For supplying the lamps or illumination devices with electrical power a plurality of conductors 56 are provided, the conductors entering the tubular member 30 at the control end thereof. The control end of the tubular member is provided with a handle 58, and associated with the handle is a pair of switching devices 60 by means of which the circuits to the illumination devices or lamps may be completed or interrupted. The conductors for supplying current to the illumination devices may be passed through the tubular member 30 and may emerge through the bottom side of the fair leader 50 from which point they may be extended to the various outlet boxes 38 and to the outlet box 20 by way of the tubular members 16 and 18. One of the switches 60 may be for the purpose of controlling the lamps 34 while the other switch may be used for controlling the lamp 24. If desired, all of the lamps may be controlled by means of a single switch.

From the above it may be seen, therefore, that it is possible for an operator positioned at the control end of the tubular member 30 to move the entire illumination device about the floor of the studio in order to direct the illumination at the desired subject from the desired angle, and since the operator is positioned a considerable distance from the sources of illumination, the device may be actually rolled into a position between the photographic or television camera and the subject. Furthermore, it may be seen that through a rotation of the reel 52 the location of the illuminated area as produced by the illumination devices 34 may be shifted in a vertical direction, whereas the area most intensely illuminated by the device 24 may be shifted in a horizontal direction by rotation of the vertical tubular member 18, by means of the control cables 33, or it may be shifted in a vertical direction by means of the reel 53. Also, it is possible for the operator selectively to extinguish the illumination devices through the operation of the control switches 60, which are conveniently placed at the control end of the tubular extension 30.

It may be seen, therefore, that a new and improved lighting device has been developed which may be readily controlled and which may be easily moved about the floor of a studio in order to follow the movements of a photographic or television camera to thereby produce the desired illumination effects.

Normally in the operation of the device a series of spot-lights are provided in the sockets 36 in order to produce rather localized illuminated areas, whereas a diffusion lamp is placed in the socket 22 in order to illuminate a larger area and to eliminate any possible detrimental shadows. Furthermore, it is to be understood that the device may be used alone but is preferably used in conjunction with other studio lighting devices such as the usual lights suspended from the ceiling of the studio. The device disclosed and described herein performs closely analogous functions as do footlights on a theatrical stage so far as the lighting of the subject or object is concerned.

Although the present invention is shown rather specifically in the various figures, it is to be understood that various modifications may be made therein. For instance, the illumination device 24 may be replaced by a plurality of such devices, all of which are rotated simultaneously about a vertical or horizontal axis, and conversely, the plurality of illumination devices 34 may be replaced by a single source of illumination. Furthermore, the rotational movement of the lamp 24 about a horizontal axis may be omitted if desired.

Various other obvious modifications and variations may be made in the present invention without departing from the spirit and scope thereof, and it is desired that any and all such modifications be considered within the purview of the present invention as hereinafter claimed.

I claim:

An illumination device comprising a moveable support member, a plurality of light sources positioned in axial alignment and spaced at predetermined distances from each other, a carrier means positioned for supporting the lights, means for rotatably mounting the carrier upon the forward end of said support member, means for moving the carrier and said light sources in unison about a horizontal axis located at the forward end of said support member so that the issuing light from each source is directed along a predetermined and adjustable path, a second carrier member located at the forward end of said support member and arranged to extend upwardly thereof, a light source carried upon said second named carrier member in a position upwardly displaced from the first group of lights, means for adjusting and rotating the second light source about a horizontal axis parallel to and displaced from the axis of rotation of the first group of lights, and means for adjusting and rotating said second named light source about an axis normal to each horizontal axis of rotation so that the second light source may be adjusted relative to said first group of lights about two axes so as to control the directional path of the emitted light and thereby diffuse the light falling upon a subject in the path of the light issuing from both sources.

WILLIAM C. EDDY.